United States Patent
Lee

(10) Patent No.: US 7,304,955 B2
(45) Date of Patent: Dec. 4, 2007

(54) SCALABLE IP MULTICAST WITH EFFICIENT FORWARDING CACHE

(75) Inventor: Whay Chiou Lee, Cambridge, MA (US)

(73) Assignee: Motorola, Inc., Schaumburg, IL (US)

( * ) Notice: Subject to any disclaimer, the term of this patent is extended or adjusted under 35 U.S.C. 154(b) by 983 days.

(21) Appl. No.: 10/109,585

(22) Filed: Mar. 28, 2002

(65) Prior Publication Data
US 2003/0185209 A1    Oct. 2, 2003

(51) Int. Cl.
  *H04J 1/16*   (2006.01)
  *H04J 3/14*   (2006.01)
(52) U.S. Cl. .................. 370/237; 370/238; 370/256; 370/342; 370/390; 370/432; 709/239; 709/240; 709/241; 709/242
(58) Field of Classification Search .............. 370/389, 370/390, 432, 216, 217, 392, 431, 237, 238, 370/256, 342; 709/239, 240, 241, 242
See application file for complete search history.

(56) References Cited
U.S. PATENT DOCUMENTS

| | | | |
|---|---|---|---|
| 6,791,949 B1 * | 9/2004 | Ryu et al. | 370/254 |
| 6,795,433 B1 * | 9/2004 | Li | 370/389 |
| 6,816,936 B1 * | 11/2004 | Wu et al. | 710/302 |
| 2002/0021675 A1 * | 2/2002 | Feldmann | 370/254 |
| 2002/0150094 A1 * | 10/2002 | Cheng et al. | 370/389 |
| 2003/0016624 A1 * | 1/2003 | Bare | 370/217 |
| 2004/0139150 A1 * | 7/2004 | McCanne et al. | 709/202 |
| 2005/0232274 A1 * | 10/2005 | Kadambi et al. | 370/392 |
| 2005/0265228 A1 * | 12/2005 | Fredette et al. | 370/216 |

* cited by examiner

*Primary Examiner*—Jean Gelin
*Assistant Examiner*—Inder Pal Mehra

(57) ABSTRACT

A method and apparatus in a multicast transmission system for routing packets including a scalable architecture that supports QoS. Redundant state information is minimized in the MOSPF multicast forwarding cache of each router in the communications system, thereby rendering MOSPF considerably more scalable. In a particular embodiment, cache redundancy is minimized by using a class of graph compression algorithms to solve a graph compression problem. In another embodiment, the forwarding cache is further consolidated by separating state information pertaining to individual source routers in a multicast group from state information pertaining to the entire multicast group.

21 Claims, 13 Drawing Sheets

SCALABLE IP MULTICAST WITH EFFICIENT FORWARDING CACHE

FIELD OF THE INVENTION

The present invention relates generally to communications systems and, more particularly, to multicast routing in Internet protocol (IP) based communication networks.

BACKGROUND OF THE INVENTION

The Internet is composed of many subnetworks having one or more hosts that are interconnected by routers. IP addressing is used to determine how a message or packet originating in a source in one subnet is to get to a destination located in a different subnetwork. Each host on the Internet has an IP address that uniquely identifies its physical location and includes information that identifies the subnet on which the host resides and also identifies the particular host. The routers then determine appropriate transmission paths for forwarding the packets across the Internet. Routers typically select transmission paths based on a predetermined cumulative metric, such as a number of hops, end-to-end delay, and cost. Where quality of service (QoS) is important, a metric related to QoS is used, wherein a small value of the metric is associated with a high level of QoS. In any case, the metric is customarily and generically referred to as cost.

Packet routing typically is performed in one of two ways: either through unicast transmission or multicast transmission. In unicast transmission, packets are sent from a single source to a single destination. Therefore, packet transmission is directed towards a single physical location that is specified by the destination host address. On the other hand, multicast transmission provides one-to-many packet transmission wherein one source is sending to multiple receivers in a given multicast group. Multicast transmission may be accomplished in several ways. In a fairly straightforward but inefficient method, the source maintains a forwarding cache that identifies all the receivers in the multicast group and sends a separate copy of the data stream to each of the receivers via unicast routing. However, if the data consists of one or more large multimedia files, the use of bandwidth becomes extremely inefficient since many of the data streams follow the same path segment through much of the network. Efficiency can be improved by controlled transmissions over a multicast topology construct, wherein at most one single copy of the data stream may traverse a link between any pair of routers.

Many techniques exist that address multicast methods of packet routing. These include: flooding, spanning tree, Steiner tree, core-based tree (CBT), reverse-path forwarding, multicast extensions to Open Shortest Path First (MOSPF) and others. Of these, only reverse-path forwarding and MOSPF (by virtue of their use of source-based shortest-path trees) support QoS routing. However, these are not very scalable. In particular, MOSPF, which is an IP multicast protocol standardized by the Internet Engineering Task Force (IETF), suffers from poor scaling because of the overhead in advertising and storing multicast state information.

Due to arbitrary tie-breaking when there are equal-cost alternate paths, MOSPF does not necessarily minimize the amount of information stored by the router in its forwarding cache. In addition, due to the inefficient structure of the forwarding cache, there is considerable redundancy in the stored information. As such, even though multicast transmission based on MOSPF is a relatively efficient method of transmitting packets to multiple destinations from a single source, it is not very scalable for IP multicast transmissions. As the number and sizes of multicast groups increase, and the amount of multimedia content being sent to distributed users increases, a need remains to improve the scalability of MOSPF for IP multicast transmissions.

DETAILED DESCRIPTION

Figure 1:
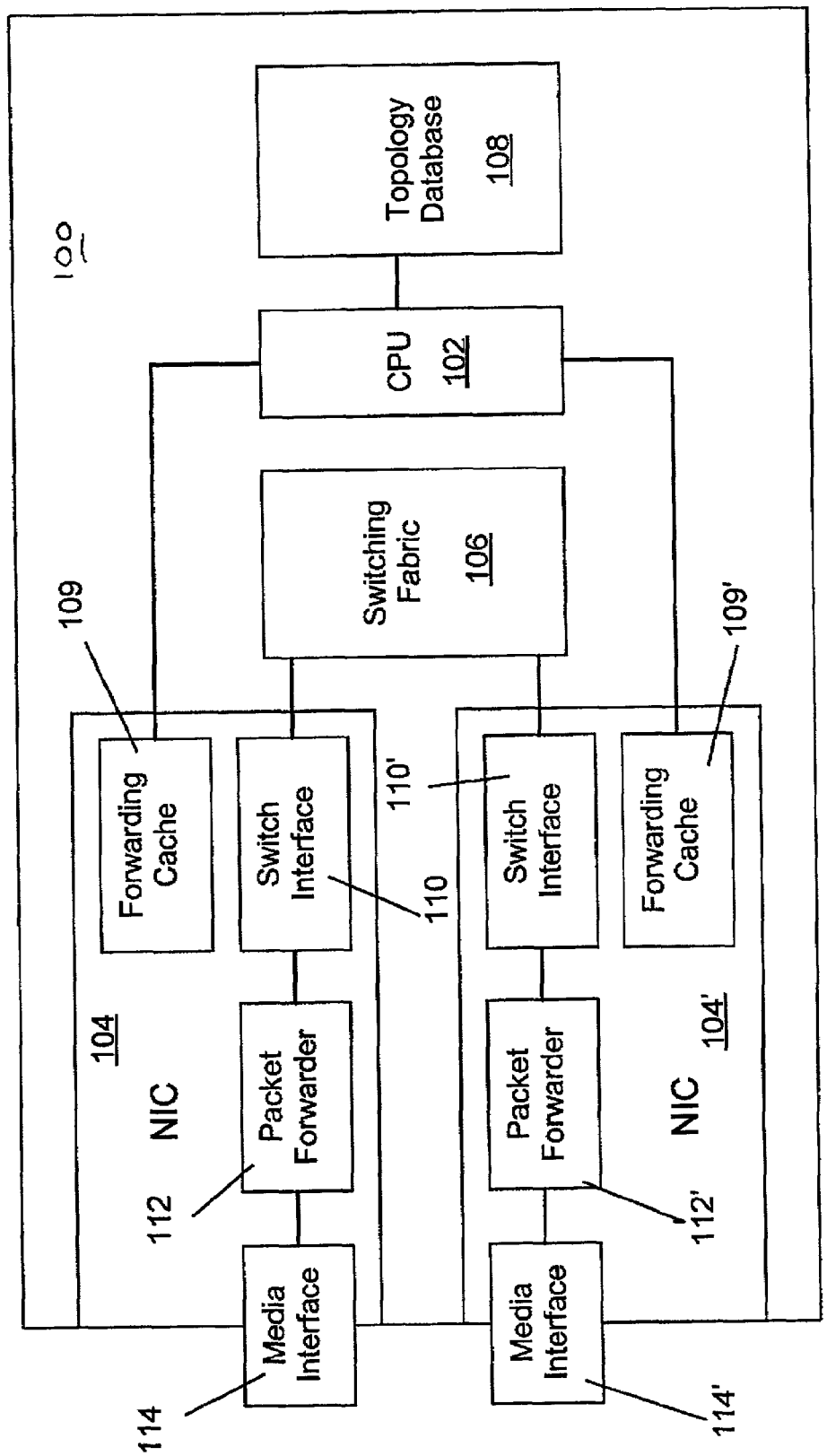
FIG. 1 is a block diagram of a router in accordance with the present invention.

In accordance with the present invention, a multicast transmission system for routing packets is provided herein including a scalable architecture that supports QoS therein. Redundant state information is minimized in the MOSPF multicast forwarding cache of each router in the communications system, thereby rendering MOSPF considerably more scalable.

MOSPF is a tree-based multicast protocol, wherein a multicast tree is used for forwarding multicast packets originated by a source to all members of a multicast group. Each router participating in the protocol must know its position in each multicast tree, or that it is not on the tree. Each multicast tree is determined upon receipt of the first packet from the source, and group membership information is used to prune the branches of the multicast tree that do not lead to any group member. A subtree composed of the router's interfaces on the pruned multicast tree is kept in a cache for subsequent forwarding of packets sent by the same source to the same multicast group.

In the prior art, each router supporting MOSPF must maintain a forwarding cache containing an entry for each active source-group pair, whose shortest path tree traverses the router. Specifically, the forwarding cache has a data structure that is {group, source, incoming interface, outgoing interfaces, TTLs}. Each cache entry indicates, for a source-group pair, an upstream node as the incoming interface, and one or more outgoing interfaces. When a multicast packet associated with a source-group pair is received by a router from the packet's designated upstream node, the packet is forwarded by the router out of each appropriate outgoing interface indicated by the forwarding cache for the source-group pair associated with the packet. Each of the outgoing interfaces in a cache entry is labeled with a TTL (time-to-live) value, which indicates a minimum number of hops a packet forwarded out of the interface would have to make before encountering a node serving a multicast destination.

In order to improve the scalability of MOSPF for IP multicast transmissions where the sizes and numbers of multicast groups increase and the amount of multimedia content being sent to distributed users increases, there is provided a method for consolidating state information in the forwarding cache, and an efficient data structure for the forwarding cache.

Specifically, the invention consolidates state information in the forwarding cache of an IP router to minimize the redundancy therein using a class of graph compression algorithms to solve a graph compression problem, wherein given a connected graph and a subset of nodes in the graph, a subgraph is determined such that a minimum number of links are included in the subgraph and for each pair of nodes in said subset of nodes, a shortest path between the nodes on the subgraph has a same length as that of a shortest path between the nodes on the original graph. It is a particular advantage of the present invention that the technique for minimizing redundancy by means of solving said graph compression problem is algorithm independent. As such, a couple of Minimum Equivalent Subspanner algorithms are used and described by way of examples only and other algorithms may be used as well. Before consolidation, the number of outgoing interfaces in the forwarding cache is not necessarily minimized due to arbitrary tie-breaking in the event of equal-cost alternate paths. After consolidation, the number of outgoing interfaces is minimized. Further, the present invention replaces the existing data structure for the forwarding cache by two components. The first component has a data structure {group, source, incoming interface}, with an entry per source-group pair. The second component has a data structure {group, outgoing interfaces, TTLs}, with simply an entry per group. It is to be noted that the original data structure, that is {group, source, incoming interface, outgoing interfaces, TTLs}, typically contains redundant information, wherein the outgoing interfaces for forwarding packets originated from different sources in a multicast group tend to be overlapped since each router typically has only a small number of interfaces. In the worst case, an interface could be recorded in the forwarding cache as many times as an order of the number of different sources in the multicast group. By using the same set of outgoing interfaces to forward packets originated by every member of a multicast group, the proposed data structure avoids storing such redundant state information in the forwarding cache. In accordance with this present invention, the same set of outgoing interfaces is a union of all sets of outgoing interfaces associated with different sources in the multicast group. It is to be noted that the size of the same set of outgoing interfaces is minimized by the first element of the present invention, that is a method for consolidating state information in the forwarding cache. It is also to be noted that the data structure of the forwarding cache in accordance with the present invention allows packets originated by a source to be forwarded over an outgoing interface that is in the same set of outgoing interfaces but is an ineligible branch of a multicast tree. This implies that a multicast packet may traverse the multicast tree beyond the last hop along a legitimate forwarding path. We refer to a packet that is forwarded beyond its last hop along a legitimate forwarding path as an illegitimate packet. The present invention provides a method for handling illegitimate packets, wherein a router receiving such a packet discards the packet. It is to be noted that, due to timely discarding of illegitimate packets, a packet may traverse at most one hop beyond its legitimate forwarding path. Without such concession, each router may have to maintain a distinct cache entry for every recently received packet, as in the case of multicast by means of flooding.

Referring to FIG. 1, an exemplary multicast router 100 in accordance with the present invention is shown. The router 100 includes one or more network interface cards (NICs) 104, 104' and a hardware packet switch 106 for connecting the interface cards. A routing topology database 108 for storing state information about other routers and links that interconnect them on the network is in communication with a processor 102. The network interface cards 104, 104' include packet switch interfaces 110, 110', packet forwarders 112, 112' and media interfaces 114, 114' for sending and receiving data packets. Each of the network interface cards 104, 104' also include forwarding caches 109, 109', also connected to the processor 102, for identifying the next hop in the network each data packet should be routed. The processor 102 is responsible for handling data packets, including related computations as described below.

As mentioned above, MOSPF is a multicast extension to OSPF (Open Shortest Path First), which is a unicast link state routing protocol that operates in a single autonomous system. Particularly, in OSPF each router 100 maintains an identical topology database 108, which is updated periodically via flooding packets carrying topology information. A forwarding cache 109 is used for specifying the next hops for incoming packets and is constructed by each router 100 based on shortest path computation performed by the processor 102 using a shortest path algorithm (e.g., Dijkstra Algorithm).

In MOSPF, each router 100 additionally advertises the identities of multicast groups. A multicast forwarding cache is determined by each router 100 for each source-group pair, using shortest path computation. Thus, there is a different shortest path tree for each source-group pair. The shortest path tree associated with a source-group pair is pruned to remove branches leading to non-existent group members.

Multicast packets associated with the source-group pair are routed over the resulting multicast tree from the root towards the leaves of the tree, and packet replication is performed at each branch. It is to be noted that there is a unique forwarding path on the pruned tree, from the source to each member of the multicast group. Although MOSPF offers the support of QoS routing by means of shortest path computation, it suffers from poor scaling because of the overhead in advertising and storing multicast state information. Specifically, each router 100 must maintain a forwarding cache entry for each active source-group pair, whose shortest path tree traverses the router 100.

Further, each router 100 must determine whether it is on a multicast tree and, if it is, its particular position in the tree. To avoid excessive storage requirements, multicast trees are computed on demand. Each multicast tree is determined upon receipt of the first packet from the source. A subtree composed of the interfaces of the router 100 on the multicast tree is kept in a forwarding cache 109 for subsequent forwarding of packets sent by the same source to the same multicast group.

Given a multicast source-group pair, a first node in the group is said to be an upstream node with respect to a second node in the group, if the first node lies along a legitimate packet forwarding path directed from the source of the multicast group to the second node. The second node is referred to as a downstream node with respect to the first node. The interface over which packets arrive at the second node over a packet forwarding path is referred to as an upstream interface with respect to the second node. The interface through which packets are forwarded out of the first node is referred to as a downstream interface with respect to the first node.

In MOSPF, each cache entry indicates, for a source-group pair, an incoming interface and one or more downstream interfaces. For each source-group pair, the incoming interface field in the forwarding cache of the router originally holds the identity of an upstream neighbor node. This is because the OSPF unicast routing protocol, of which MOSPF is an extension, permits equal-cost alternate paths from the source to the router 100 maintaining the forwarding cache 109. In practice, due to a consistent tie-breaking requirement in MOSPF, equal-cost alternate paths are no longer permitted. As such, each source identifies a unique incoming interface over which packets originated by the source are received by the router if they are to be considered legitimate.

A consistent tie-breaking rule is needed to guarantee that when there are multiple alternate paths of the same cost, all routers agree on the same one among the alternate paths. This is necessary to prevent loops and duplicates in the multicast. The method for breaking ties is implementation-specific, as long as it is consistent among all routers so that the incoming interface associated with each source-group pair is uniquely identified at each router. In other words, although the specific tie-breaking method is not standardized, it is required by the standard that the same tie-breaking method be used among all routers. In MOSPF, the recommended tie-breaking method is based on a preconfigured preference ordering of incoming link types as well as node identifiers.

Multicast packets originated by a source and received over an interface different from the incoming interface associated with that source are discarded. Such discarding prevents unwanted replication of multicast packets. It is to be noted that, if all the outgoing interfaces are correctly identified, multicast packets will be received over appropriate incoming interfaces under a normal operation, and hence will not be discarded. Nonetheless, an incoming interface is still useful for identifying illegitimately received packets in the event of an erroneous forwarding.

In MOSPF, the outgoing interfaces indicated in the forwarding cache of a router for each source-group pair are downstream interfaces over each of which the router must forward a copy of a multicast packet that is received legitimately over a corresponding incoming interface. Each outgoing interface is labeled with a TTL (time-to-live) value, which indicates a minimum number of hops a packet forwarded out of the interface would have to make before encountering a node serving a multicast destination. This value allows the router to drop packets that have traversed an excessive number of other routers on their way to this router.

Figure 2:
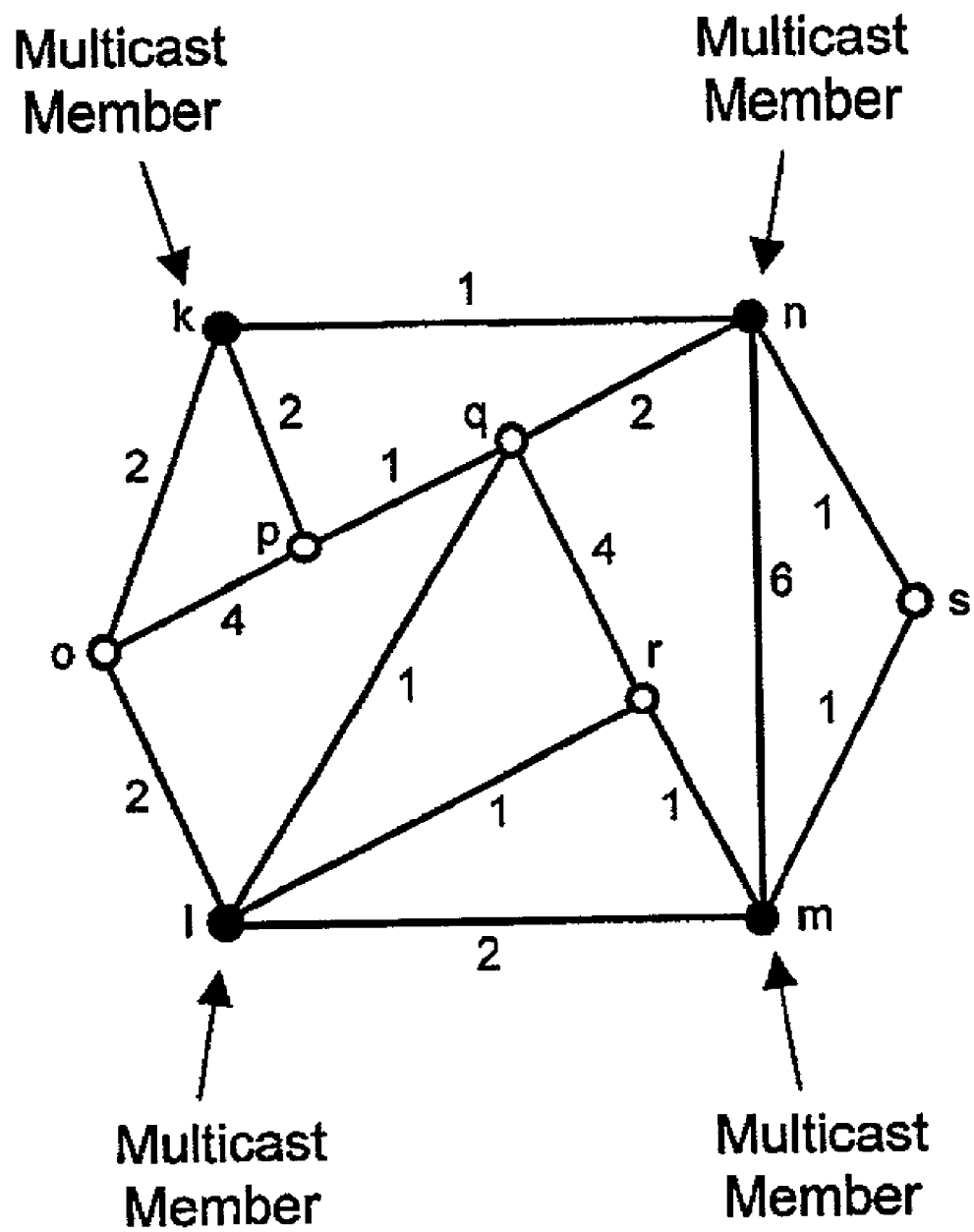
FIG. 2 is a graphical representation of an exemplary network topology in which nodes k, l, m, and n are members of a multicast group.

FIG. 2 shows a graph representation of an example of a multicast network, which is used herein for illustrative purposes. In this graph, nodes represent routers, and links represent transmission facilities. Each link is characterized by a value of a metric that is used for path selection. This metric value is often generically referred to as cost. A shortest path, i.e., one with the smallest cumulative link metric value, is generally preferred. A graph is typically denoted as $G=(V, E)$, where V is a set of nodes and E is a set of links. The cost of a shortest path from node u to node v in G is typically denoted $d(u, v, G)$.

In the example of FIG. 2, nodes k, l, m, and n, which are darkened, are members of a given multicast group. Nodes q, r, and s, which are not darkened, are non-members of the multicast group. A multicast packet sent to the multicast group is to be received by all members of the multicast group. Each member of a multicast group is enabled to send multicast packets to the multicast group. As shown, each of the multicast members is interconnected through one or more paths to enable data packets to be passed among multicast members.

Figure 3:
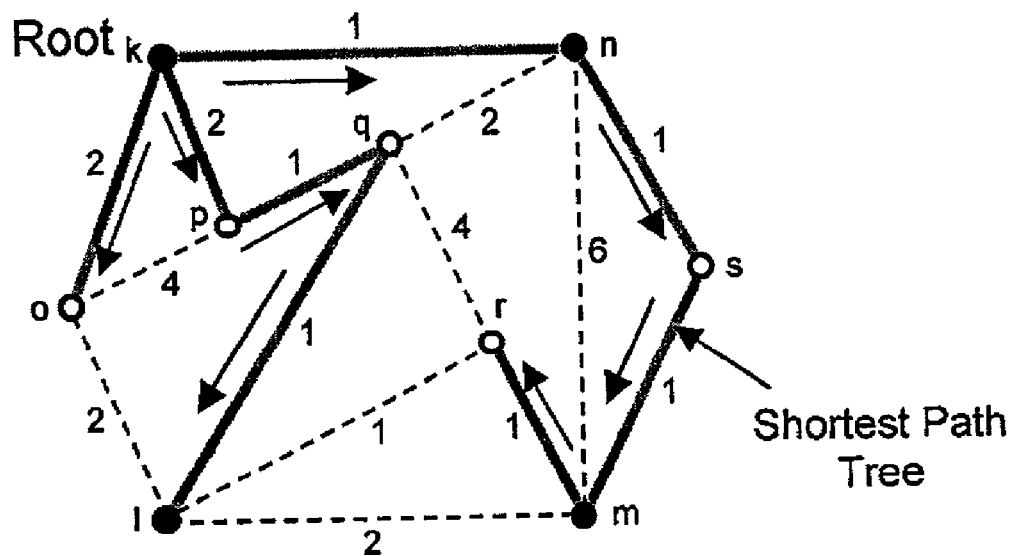
FIG. 3 is a graphical representation of a shortest path tree rooted at a multicast source node k in the network of FIG. 2.
Figure 4:
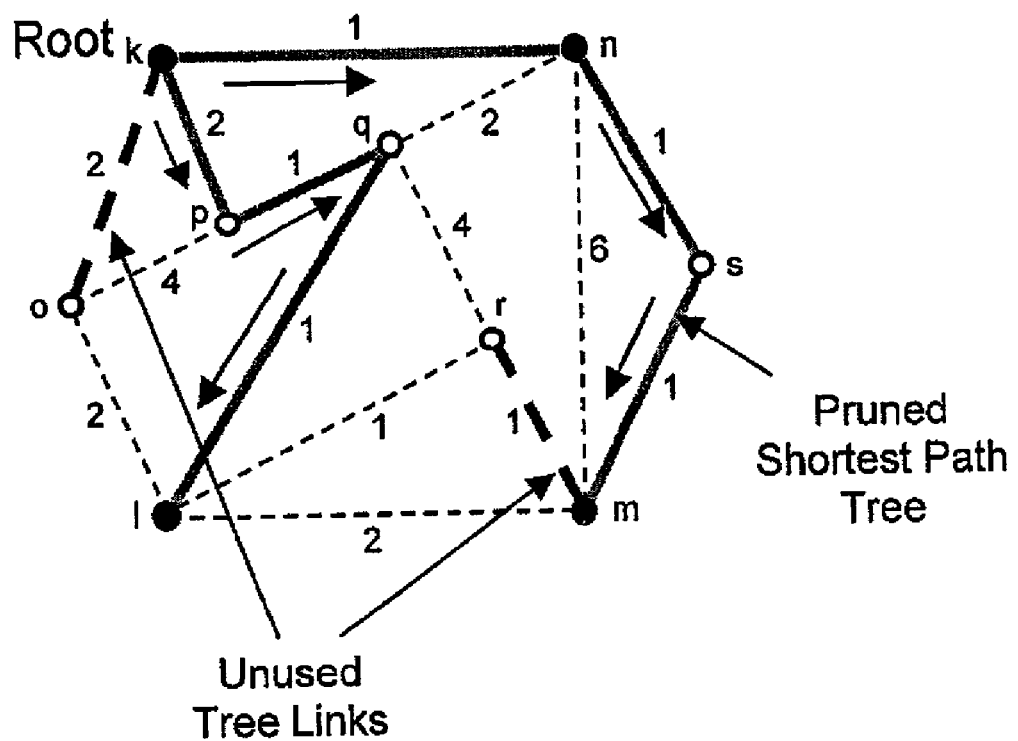
FIG. 4 is a graphical representation of the shortest path tree in FIG. 3, wherein branches that are not used for multicast are pruned.

In accordance with standard MOSPF operating procedures, for each source in a multicast group in an OSPF area, all routers calculate the same source-based shortest path tree for delivering multicast packets originated by the source. For example, a shortest path tree rooted at the multicast source node k is shown in FIG. 3. Referring to FIG. 4, the shortest-path tree is pruned to remove branches, or unused tree links, that do not lead to any multicast members downstream.

Figure 5:
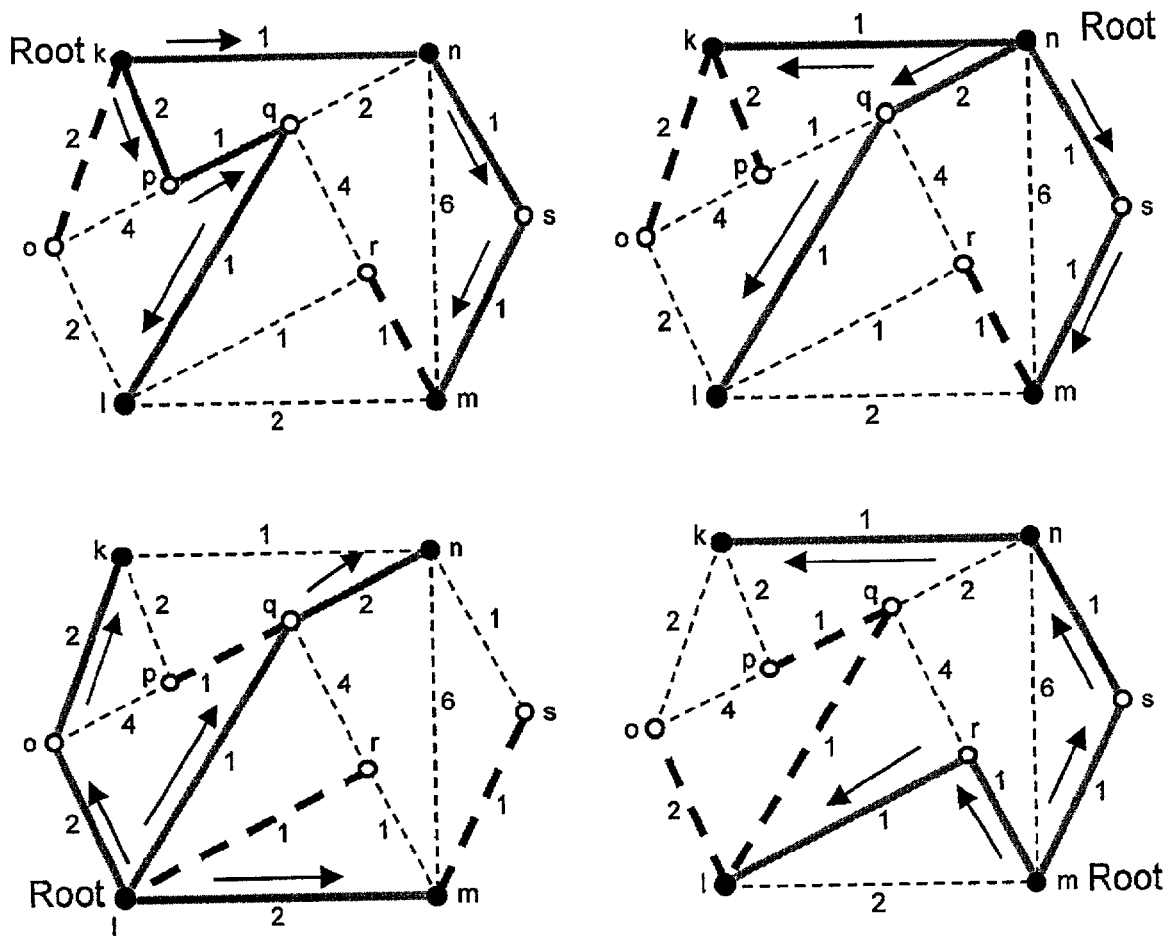
FIG. 5 is a graphical representation of pruned shortest path trees for multicast routing in the network of FIG. 2 based on arbitrary tie breaking.
Figure 6:
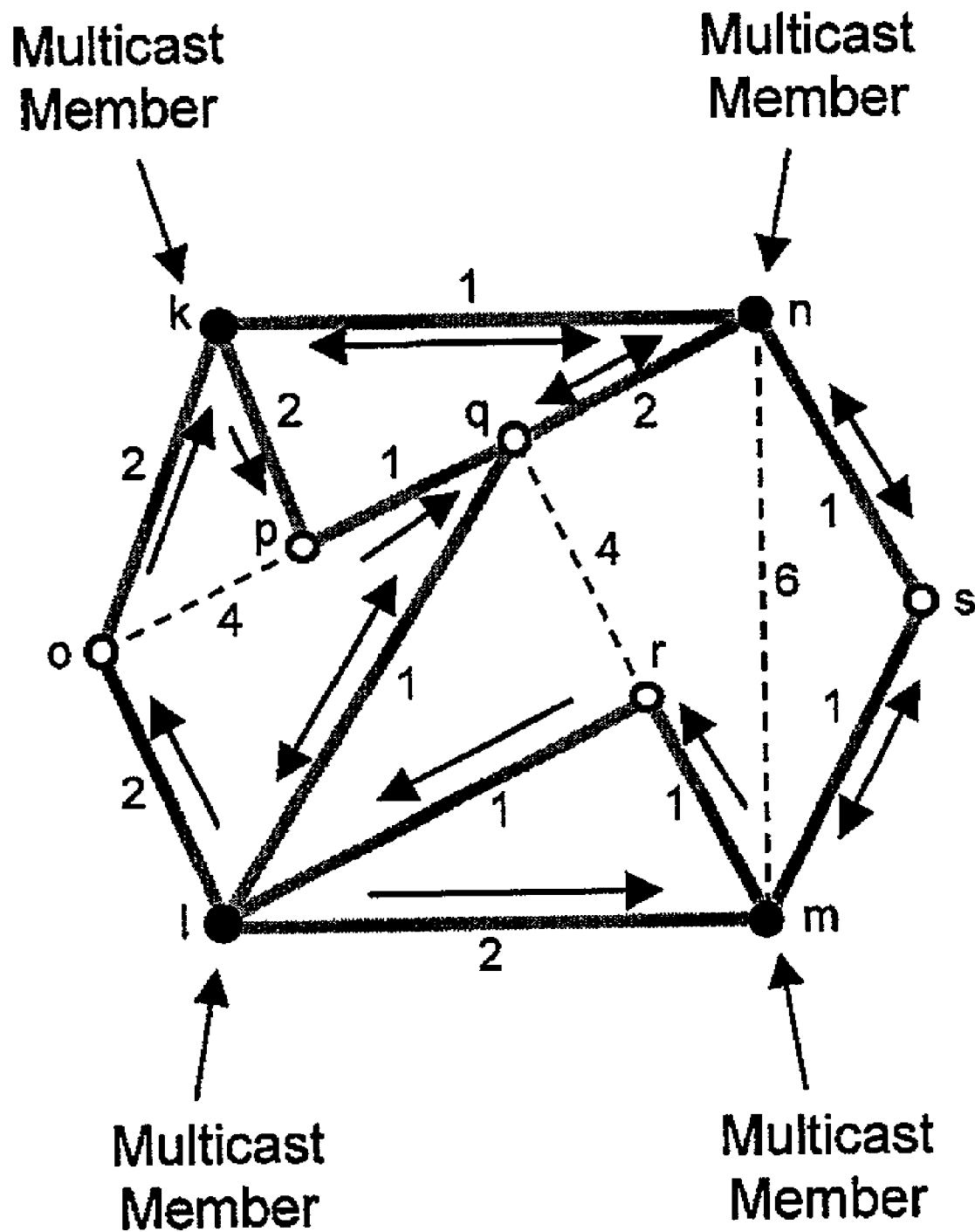
FIG. 6 is a graphical representation of the union of the pruned shortest path trees of FIG. 5.

Referring to FIG. 5, there is shown a number of pruned shortest path trees, which are constructed using nodes k, n, l and m as root nodes. An arbitrary tie-breaking rule is used whenever there are equal-cost alternate paths. The tie-breaking rule is selected to be different from the one used in the present invention in order to highlight the advantage of the present invention. Turning to FIG. 6, there is shown a union of the pruned shortest path trees of FIG. 5.

The outgoing and incoming interfaces in the multicast forwarding caches kept by each node in the network of FIG. 2 and the corresponding content of the forwarding cache of each router in the exemplary network, in accordance with a prior art example, is shown in Table 1 below.

TABLE 1

| Node | Outgoing Interface(s) | | | | Incoming Interface | | | |
|---|---|---|---|---|---|---|---|---|
| | Source k | Source l | Source m | Source n | Source k | Source l | Source m | Source n |
| k | n, p | N/A | N/A | N/A | N/A | o | n | n |
| l | N/A | m, o, q | N/A | N/A | q | N/A | r | q |
| m | N/A | N/A | r, s | N/A | s | l | N/A | s |
| n | s | N/A | k | k, q, s | k | q | s | N/A |
| o | N/A | k | N/A | N/A | N/A | l | N/A | N/A |
| p | q | N/A | N/A | N/A | k | N/A | N/A | N/A |
| q | l | n | N/A | l | p | l | N/A | n |
| r | N/A | N/A | l | N/A | N/A | N/A | m | N/A |
| s | m | N/A | n | m | n | N/A | m | n |

As seen in Table 1, there exists significant redundancy in the forwarding cache of a router because the outgoing interfaces are likely to overlap for shortest path trees rooted at different sources belonging to the same group. For example, in the forwarding cache of node s, the same outgoing interface is associated with node k and node n. Hence, a need remains for minimizing such redundancy in the forwarding cache.

There is known in the literature a graph theoretic problem to determine a compressor graph $G_t=(U, E_t)$, for a given graph $G=(V, E)$, U being a subset of V, and $E_t$ being a subset of E, wherein for each pair of nodes u and v in U, $d(u, v, G_t) \leq t \cdot d(u, v, G)$, where $t \geq 1$. The parameter t is widely known as a stretch factor associated with the compressor graph $G_t$. A compressor graph $G_1$, i.e., where t=1, is said to be a lossless compressor graph. A minimum lossless compressor graph is a lossless compressor graph with a smallest set $E_t$.

In a special case of the graph compression problem, U=V, and the corresponding compressor graph is often known as a spanner graph. A t-spanner of a graph, $G=(V, E)$, is defined as a spanner graph, $G_t=(V, E_t)$, of G where $E_t$ is a subset of E. And, for each pair of nodes u and v in V, $d(u, v, G_t) \leq t \cdot d(u, v, G)$, where $t \geq 1$. The fact that $E_t$ is a subset of E implies further that $d(u, v, G) \leq d(u, v, G_t)$. A t-spanner with a minimum number of links is known as a minimum t-spanner. A 1-spanner is referred to as an equivalent spanner, and one with a minimum number of links as a minimum equivalent spanner. There exist in the art algorithms for determining t-spanners subject to a stretch factor $t \geq 1$. It is also known in the art to use a polynomial time algorithm for determining a minimum 1-spanner for a weighted graph with undirected links.

Where U is proper subset of V, such that there is at least one node in V but not in U, the t-spanner of a graph is more specifically referred to as a t-subspanner of the graph. A 1-subspanner, i.e., where t=1, is referred to as an equivalent subspanner. A t-subspanner with a minimum number of links is known as a minimum t-subspanner. A minimum 1-subspanner is also referred to as a minimum equivalent subspanner. In principle, any algorithm that solves the minimum 1-spanner problem can be used to solve the minimum 1-subspanner problem by first determining a full mesh representation with respect to the set of border nodes and then applying a 1-spanner algorithm to the full mesh representation. A full mesh representation of the graph G with respect to U is an auxiliary graph $G_f=(U, V')$ such that V' is a complete set of links connecting nodes in U. The link cost of each link in V', connecting node u to v, is the same as d(u, v, G), the cost of a shortest path from node u to node v in G.

In accordance with the present invention, the problem of minimizing redundancy in the forwarding cache is formulated as a minimum equivalent subspanner graph compression problem. Specifically, given the set U of nodes, which are referred to as terminal or border nodes, a link cost associated with each link and a path selection objective based on a given path cost that is a sum of link costs along a selected path, a minimum equivalent subspanner, S=(U, L), is determined such that for each pair of nodes u and v in U, d(u, v, G)=d(u, v, S) and the number of links in L is minimized.

Two efficient algorithms for determining a minimum equivalent subspanner (MES) are known. The MES algorithms, which are derived from simple extension of two well-known shortest path algorithms, namely the Floyd-Warshall Algorithm and the Dijkstra Algorithm, are referred to as Modified Floyd-Warshall MES Algorithm and Modified Dijkstra NES Algorithm respectively, as disclosed in U.S. Pat. No. 6,122,283 (2000) to the same inventor as the present invention. These algorithms are computationally efficient because their complexity is comparable to that of using a Dijkstra algorithm and a Floyd-Warshall algorithm respectively to determine a full mesh representation, which generally is a required step in most existing algorithms for determining a minimum equivalent subspanner. By using appropriate link or node labels, the MES algorithms efficiently identify redundant links while computing all-pair shortest paths. By avoiding the use of redundant links, the MES algorithms generate shortest path trees that are minimum branching at their respective root nodes.

Accordingly, in an aspect of the invention, a Modified Dijkstra MES Algorithm is used to improve the scalability of MOSPF, a link state multicast protocol that uses a conventional Dijkstra Algorithm for determining packet forwarding caches. The Dijkstra methodology finds the shortest path in order of increasing path length from one node to all other nodes in the network.

Figure 7:
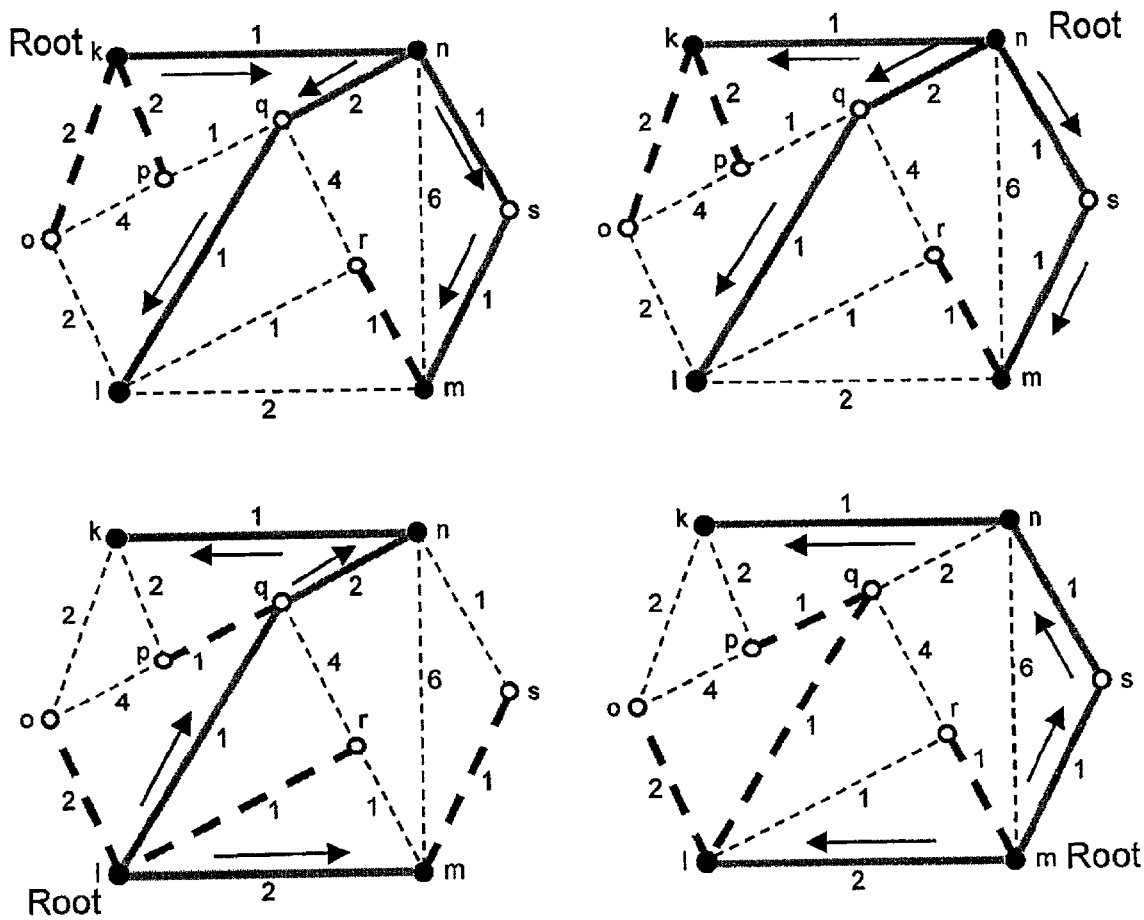
FIG. 7 is a graphical representation of pruned minimum-branching shortest path trees for multicast routing in the network of FIG. 2 in accordance with the present invention.
Figure 8:
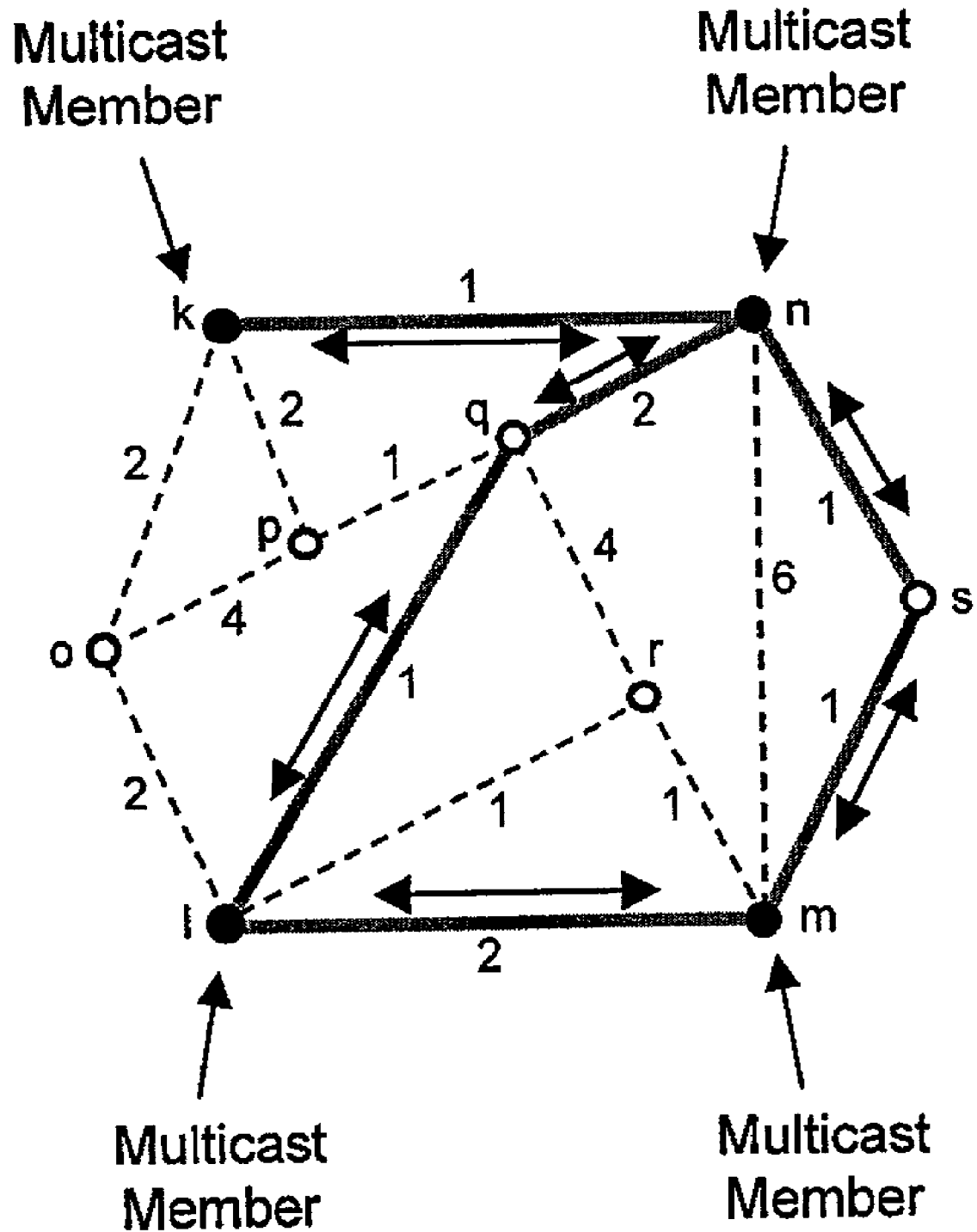
FIG. 8 is a graphical representation of the union of the pruned minimum-branching shortest path trees of FIG. 7.

Referring to FIG. 7, there is shown a number of minimum branching shortest path trees, which are determined by an MES algorithm using nodes k, n, l and m as root nodes. These trees are pruned to remove branches that do not lead to any multicast members downstream. A union of the pruned minimum branching shortest path trees of FIG. 7 is shown in FIG. 8.

The corresponding content of the forwarding cache of each router in the exemplary network and the outgoing and incoming interfaces in the consolidated multicast forwarding caches kept by each node in the network of FIG. 2 are shown in Table 2 below.

TABLE 2

| | Outgoing | Incoming Interface | | | |
|---|---|---|---|---|---|
| Node | Interface(s) | Source k | Source l | Source m | Source n |
| k | n | N/A | n | n | n |
| l | m, q | q | N/A | m | q |
| m | l, s | s | l | N/A | s |
| n | k, q, s | k | q | s | N/A |
| o | N/A | N/A | N/A | N/A | N/A |
| p | N/A | N/A | N/A | N/A | N/A |
| q | l, n | n | l | N/A | n |
| r | N/A | N/A | N/A | N/A | N/A |
| s | m, n | n | N/A | m | n |

It is to be noted that a union of the shortest-path trees associated with a multicast group reflects the amount of information that is collectively contained in the forwarding caches of all routers in a multicast network. Referring to FIG. 6 and FIG. 8, it is straightforward to verify the efficiency of forwarding caches in accordance with the present invention as compared to that in accordance with a prior art MOSPF system that utilizes an arbitrary tie-breaking.

The improvement is derived from minimizing redundancy in the forwarding cache of each router. It is to be noted that, given a record, in the forwarding cache of a router, of the identities of a multicast group, a source, and the incoming interface associated with the source-group pair, the router knows if a multicast packet it has received is legitimate, i.e., meant to be received from that incoming interface, or it could simply be discarded. Packets that are received from the incoming interface associated with the appropriate source-group pair are legitimate. Otherwise, the packets are considered illegitimate. Illegitimate packets that are received by a router are immediately discarded by the router, thereby preventing forwarding loops. In this respect, it is possible to consolidate the forwarding cache entries as follows:

Entry per Group: (group, outgoing interfaces, TTLs)
Entry per Source-Group Pair: (group, source, incoming interface)

Furthermore, as described below, the number of outgoing interfaces at each router also may be minimized for greater efficiency.

As mentioned above, a downstream interface associated with a next hop of a forwarding path in a router is defined with respect to a shortest path tree. In this respect, a leave node on the shortest path tree, which represents an end of a legitimate forwarding path, has no downstream interface with respect to the forwarding path. On the other hand, outgoing interfaces in a multicast forwarding cache are defined with respect to a multicast forwarding protocol. In accordance with the present invention, a downstream interface is also an outgoing interface, but an outgoing interface may not be a downstream interface. This permits a packet to be forwarded out of an interface that is not a downstream interface, beyond the last hop along a legitimate forwarding path. This is possible because the node receiving the packet discards the packet after recognizing that the packet has not been received over an upstream interface. This enables consolidating the multicast trees associated with a multicast group into a minimum equivalent subspanner.

Figure 9:
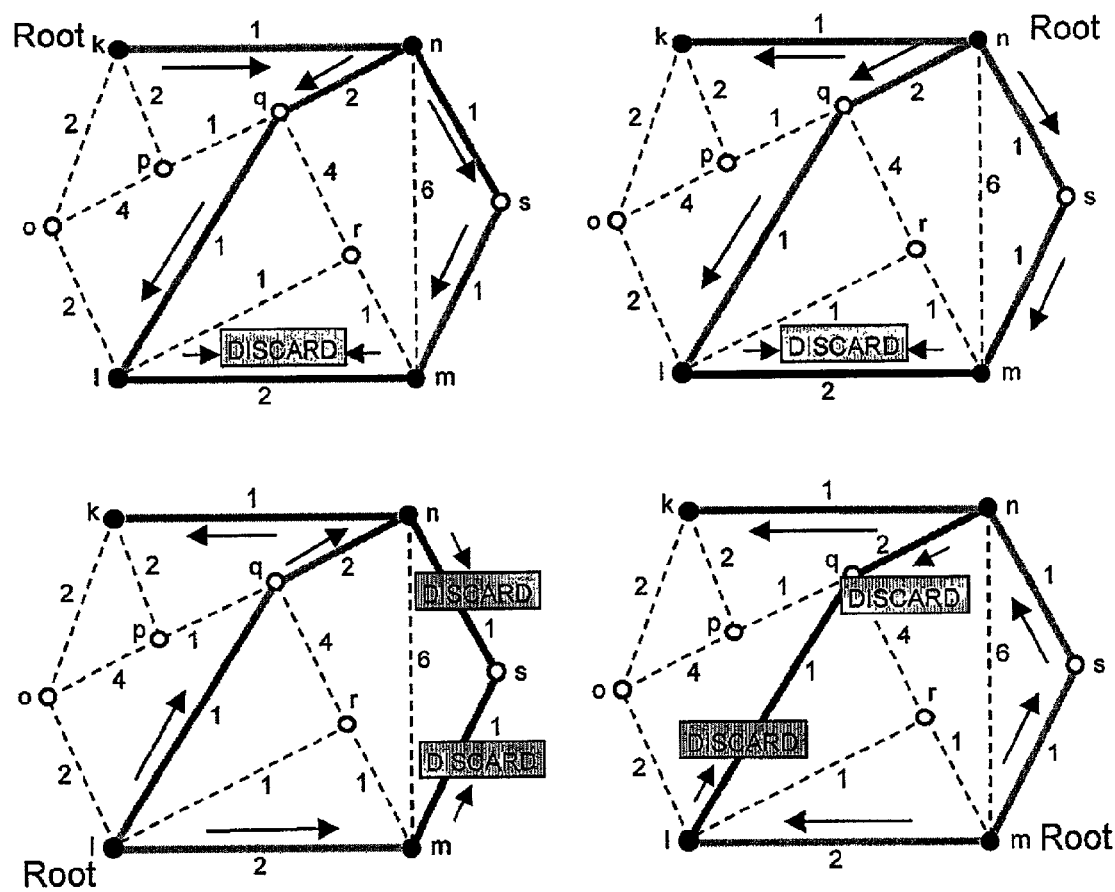
FIG. 9 is a graphical representation of discard of illegitimate packets forwarded over unnecessary branches of pruned the minimum-branching shortest path trees of FIG. 7.

As shown in FIG. 9, illegitimate packets are discarded in a timely manner. For example, the path between nodes m and l are discarded when nodes k and n are the source or root. Similarly, where node l is the root, packets between node n and s and s and m are discarded. Where node m is the root, packets between nodes n and q and q and l are discarded. Accordingly, a packet is allowed to loop around on the minimum equivalent subspanner at most once. Thus, a particular advantage of such a packet discard system is that, because the routers are not required to maintain cache entries for paths that are illegitimate, the router caches are considerably smaller. Otherwise, each router would be required to maintain a distinct cache entry for every recently received packet, as in the case of multicast by means of flooding.

A minimum equivalent subspanner is maintained for each multicast group as long as its membership remains unchanged. A minimum equivalent subspanner is a union of pruned minimum branching shortest-path trees rooted at the terminal nodes. If a source is also a member of a multicast group, then the source must include as outgoing interfaces, all branches on the pruned minimum branching shortest path tree rooted at the source, leading to the source's nearest terminal node neighbors, in its forwarding cache. The source forwards its multicast packets for the multicast group out of all these outgoing interfaces.

Figure 10:
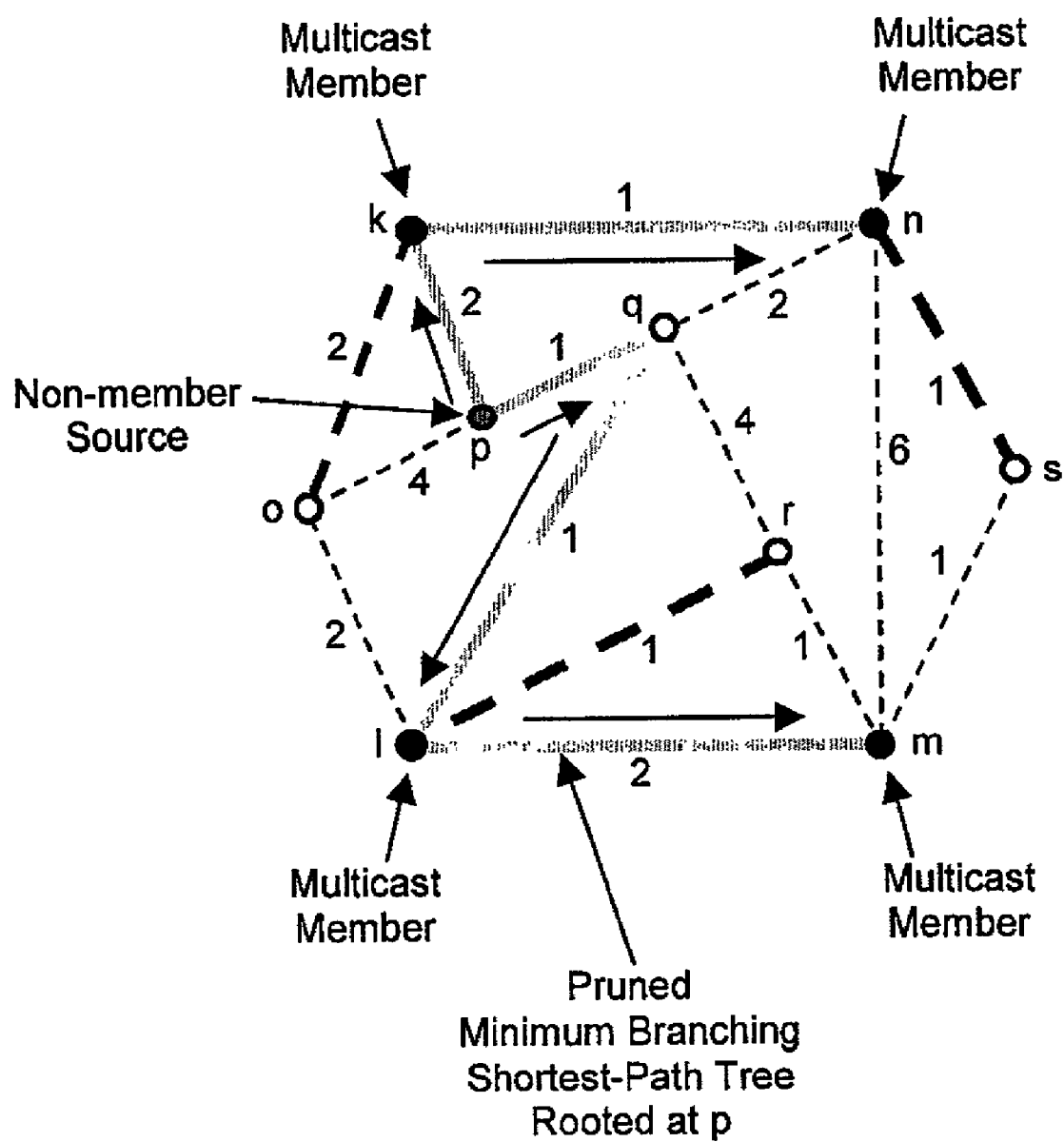
FIG. 10 is a graphical representation of a pruned minimum-branching shortest path tree rooted at a non-member source node p in the network of FIG. 2 in accordance with the present invention.
Figure 11:
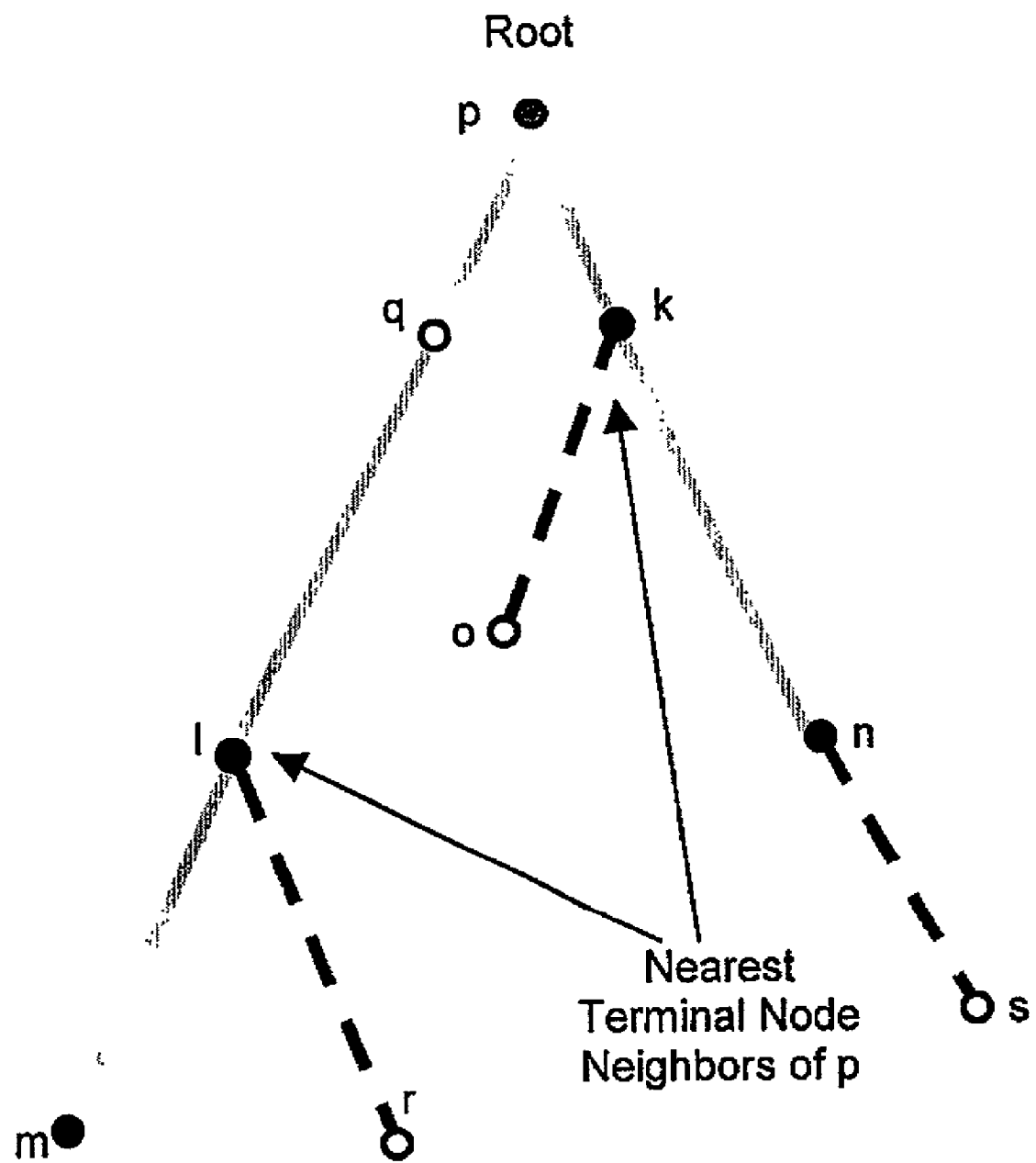
FIG. 11 is an alternative graphical representation of the pruned minimum-branching shortest path tree of FIG. 10, wherein nearest terminal node neighbors of the source node p are identified.

If a source is not a member of the multicast group, each router determines additional tributaries from this source to the minimum equivalent subspanner associated with the group. Using the Modified Dijkstra MES Algorithm, each router determines a pruned minimum branching shortest path tree rooted at the source node. For example, let node p in the multicast network of FIG. 2 be a non-member source. A pruned minimum branching shortest path tree rooted at node p is shown in FIG. 10. If the router is the source node, i.e., node p, then all branches on the pruned minimum branching shortest path tree leading to the source node's nearest terminal node neighbors are included as outgoing interfaces in the forwarding cache of the router, as illustrated in FIG. 11. Any other router establishes its forwarding cache for the source-group pair in accordance with its location and relation with its neighbors on the pruned minimum branching shortest path tree. For example, the router represented by node q, which is a child of the source node on the pruned minimum branching shortest path tree, shall indicate that the source node is on the incoming interface and node l is on the outgoing interface.

Figure 12:
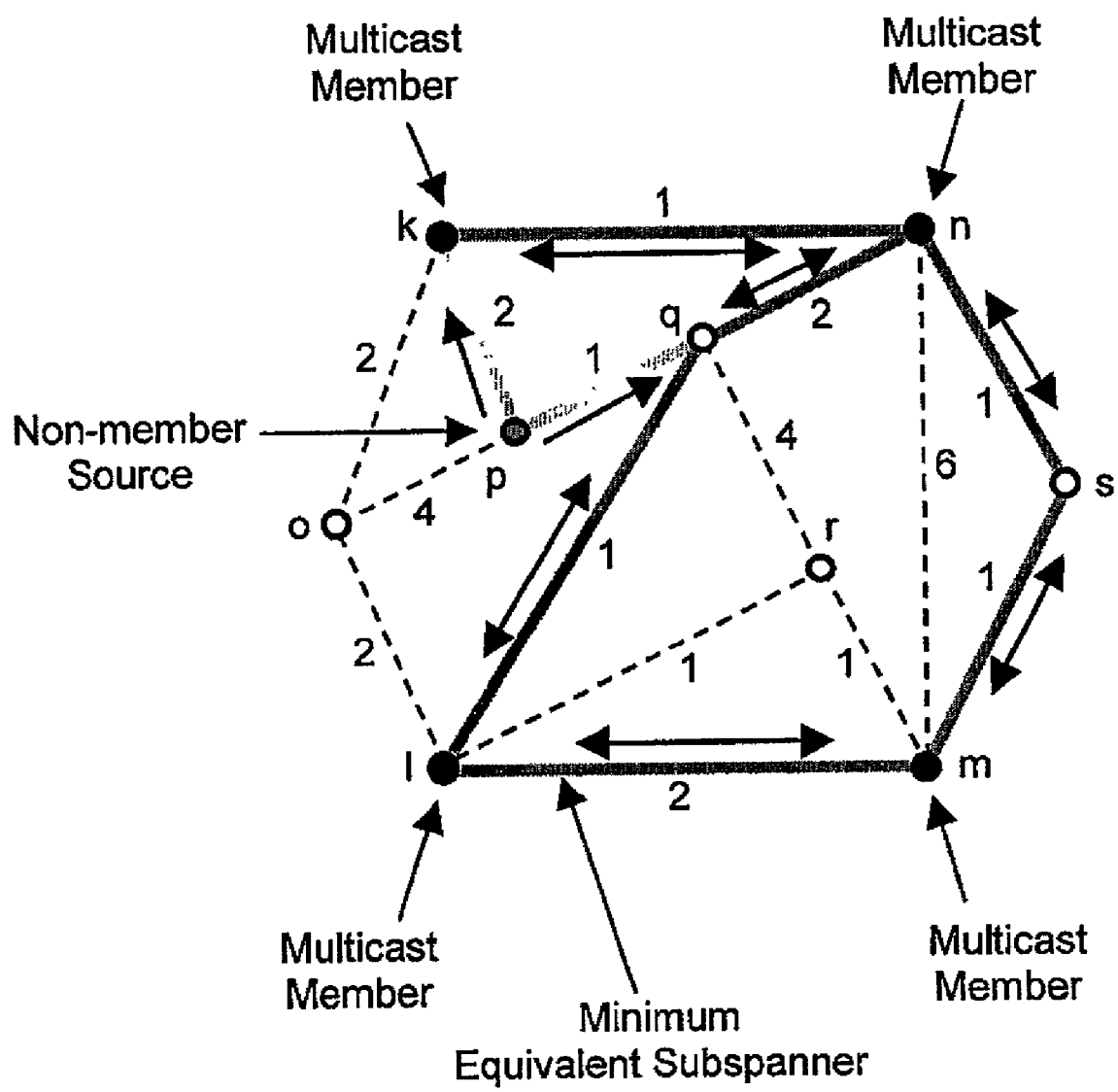
FIG. 12 is a graphical representation of a union of the pruned minimum branching shortest path trees of FIG. 8 and FIG. 10.

In accordance with the present invention, the forwarding cache associated with each non-member source is consolidated with the forwarding cache associated with the multicast group to minimize redundancy. Referring to FIG. 12, there is shown a union of the pruned minimum branching shortest path tree rooted at the non-member source, i.e., node p, and the union of the pruned minimum branching shortest path trees rooted at the multicast members, which is shown in FIG. 8.

Figure 13:
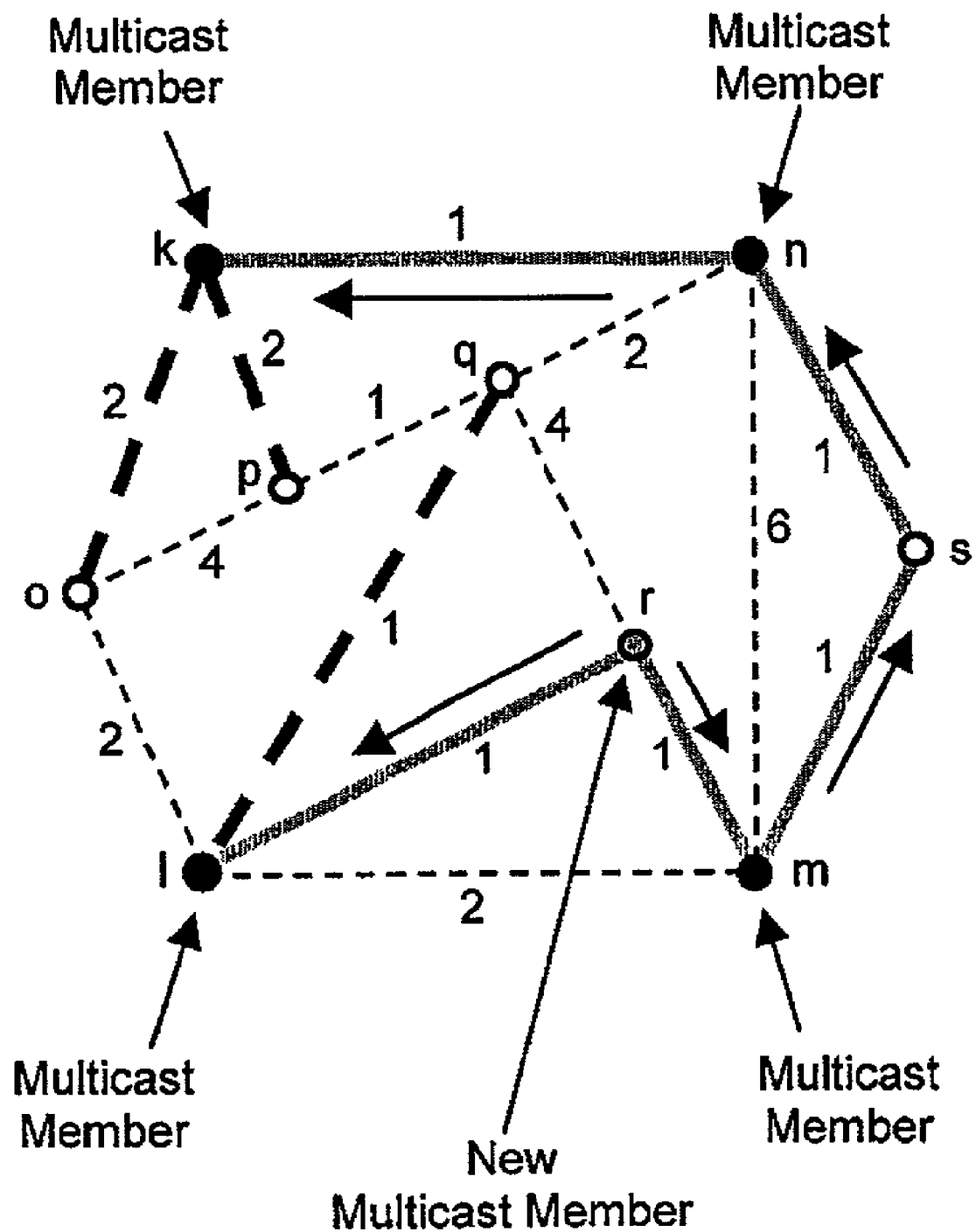
FIG. 13 is a graphical representation of a pruned minimum-branching shortest path tree for a new multicast member node in accordance with the present invention.
Figure 14:
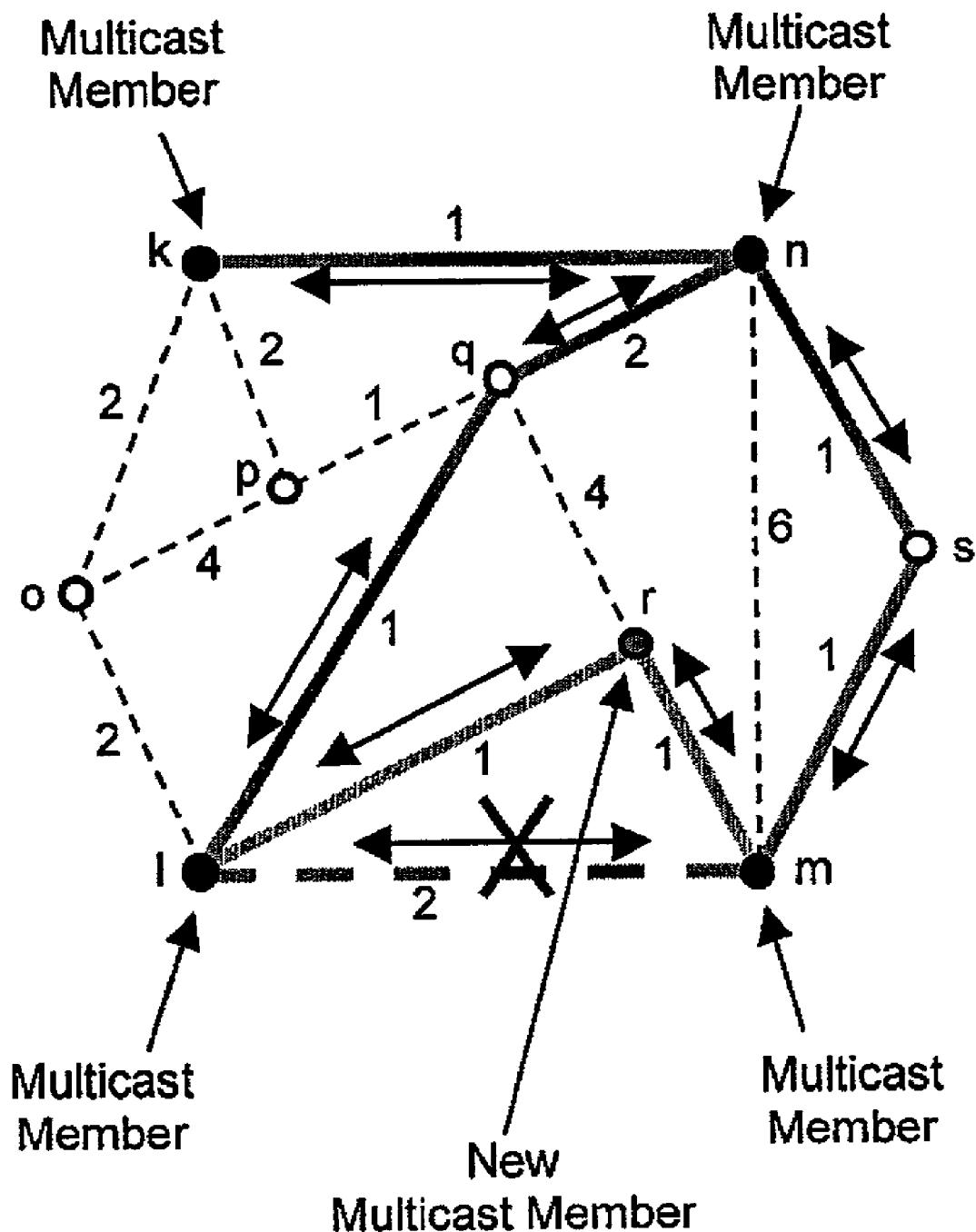
FIG. 14 is a graphical representation of redundant interface removal of the pruned minimum-branching shortest path trees of FIG. 13.

Referring to FIG. 13, if a new member is added to the multicast group, such as node r, for example, the existing multicast mesh is updated. A pruned minimum branching shortest path tree rooted at node r is determined using the Modified Dijkstra MES Algorithm. The existing multicast mesh is then updated by taking a union of the existing multicast mesh and all interfaces identified by said pruned minimum branching shortest path tree, which connects node r to its nearest terminal node neighbors l and m. For each existing terminal node of the group the resulting multicast mesh is checked for alternate shortest paths from the terminal node to its nearest terminal node neighbors using node r as an immediate terminal node neighbor. As shown in FIG.

14, if such a path exists, for example between nodes m and l, the interface leading to the corresponding old terminal node neighbor is removed.

While the invention has been particularly shown and described with reference to a particular embodiment, it will be understood by those skilled in the art that various changes in form and details may be made therein without departing from the spirit and scope of the invention, and it is intended that such changes come within the scope of the following claims.

What is claimed is:

1. A router for performing multicast routing, comprising:
at least one incoming interface for receiving a packet from at least one other router;
at least one outgoing interface for forwarding the packet to the at least one other router;
a data cache for storing packet handling information;
a controller for handling packets; and
a processor to
 implement a minimum equivalent subspanner routing algorithm that determines a minimum number of outgoing interfaces for forwarding the packet, wherein the routing algorithm minimizes redundancy in the data cache and generates shortest path trees that are minimum branching at respective root nodes.

2. The router of claim 1, wherein the routing algorithm comprises:
means for determining an outgoing interface for forwarding a packet that is identified by a unicast destination address; and
means for determining a minimum number of outgoing interfaces for forwarding a packet that is identified by a pair of source address and multicast destination address.

3. The router of claim 2, wherein the means for determining a minimum number of outgoing interfaces for forwarding the packet that is identified by a pair of source address and multicast destination address includes an algorithm comprising:
means for determining a minimum branching shortest path tree rooted at each router that is a member of a multicast group, wherein ties among alternate shortest paths are resolved consistently;
means for obtaining a union of the minimum branching shortest path trees;
means for including all of the router's interfaces associated with edges belonging to the union as outgoing interfaces;
means for excluding the incoming interface through which the packet is received; and
means for excluding additional outgoing interfaces that may be excluded by the controller to avoid forwarding loops.

4. The router of claim 1, wherein the data cache comprises:
a unicast cache entry containing data identifying an outgoing interface for each unicast destination address;
a per-group multicast cache entry containing data identifying one or more outgoing interfaces for each multicast destination address; and
a per-source-group-pair cache entry containing data identifying an incoming interface for each pair of source address and multicast destination address.

5. The router of claim 4, wherein the controller for handling packets comprises:

means for identifying whether an incoming packet carries a pair of source address and multicast destination address;
means for locating the per-source-group-pair multicast cache entry associated with the pair of source address and multicast destination address, means for comparing the incoming interface identified by the per-source-group-pair multicast cache entry with the incoming interface through which the packet is received by the router, means for discarding the packet if the incoming interfaces are different; and means for forwarding the non-discarded packet in accordance with the routing protocol.

6. In a router for performing multicast routing, a method for routing packets, the method comprising the steps of:
receiving a packet into an incoming interface from at least one other router;
forwarding a packet over at least one outgoing interface to at least one other router;
implementing a minimum equivalent subspanner routing algorithm for determining a minimum number of outgoing interfaces for forwarding the packet;
storing packet handling information in a data cache;
handling the packets in accordance with the stored packet handling information; and
minimizing redundancy in the data cache and generating shortest path trees that are minimum branching at respective root nodes.

7. The packet routing method of claim 6, wherein the determining step further comprises the steps of:
determining an outgoing interface for forwarding a packet that is identified by a unicast destination address; and
determining a minimum number of outgoing interfaces for forwarding a packet that is identified by a pair of source and multicast destination addresses.

8. The packet routing method of claim 7, wherein the step for determining a minimum number of outgoing interfaces further comprises the steps of:
determining a minimum branching shortest path tree rooted at each router that is a member of a multicast group, wherein ties among alternate shortest paths are resolved consistently;
obtaining a union of the minimum branching shortest path trees; and
including all of the router's interfaces associated with edges belonging to the union as outgoing interfaces;
excluding the incoming interface through which the packet is received; and
excluding additional outgoing interfaces that may be excluded by the controller to avoid forwarding loops.

9. The packet routing method of claim 6, wherein the storing step further comprises the steps of:
identifying an outgoing interface for each unicast destination address and storing the identifying data in a unicast cache entry;
identifying one or more outgoing interfaces for each multicast destination address and storing the identifying data in a per-group multicast cache; and
identifying an incoming interface for each pair of source address and multicast destination address and storing the data in a per-source-group-pair cache.

10. The packet routing method of claim 9, wherein the data in the per-group multicast cache entry is determined in accordance with the following steps:
determining a minimum branching shortest path tree rooted at each router that is a member of a multicast group;

obtaining a union of the minimum branching shortest path trees; and including in the per-group multicast cache entry all of the router's interfaces associated with edges belonging to the union.

11. The router of claim 9, wherein the data in the per-source-group-pair multicast cache entry is determined in accordance with the following steps:

determining a minimum branching shortest path tree rooted at each router that is a member of a multicast group, wherein ties among alternate shortest paths are resolved consistently;

obtaining a union of the minimum branching shortest path trees; and including in the per-source-group-pair multicast cache entry the router's interface through which a packet routed from the source router along a shortest path in the union is received by the router.

12. A router for performing multicast routing, comprising:

at least one incoming interface for receiving a packet into the router;

at least one outgoing interface for forwarding a packet out of the router;

a data cache for storing packet handling information;

means for minimizing the number of outgoing interfaces; and a processor to implement a minimum equivalent subspanner routing algorithm that determines a minimum number of outgoing interfaces for forwarding the packet, wherein the routing algorithm minimizes redundancy in the data cache and generates shortest path trees that are minimum branching at respective root nodes.

13. The router of claim 12, further comprising means for consolidating data entries in the data cache corresponding to the minimized number of outgoing interfaces.

14. The router of claim 13, wherein the consolidated cache entry comprises an entry per group and an entry per source-group pair.

15. The router of claim 13, wherein the entry per group cache entry comprises information indicating group, outgoing interface and TTL.

16. The router of claim 13, wherein the entry per source-group pair comprises information indicating group, source and incoming interface.

17. In a multicast group, a method for minimizing redundancy in the forwarding cache of each router, wherein shortest path trees rooted at routers of the multicast group are used for forwarding multicast packets associated with the multicast group, the method comprising the steps of:

determining outgoing interfaces for all multicast packets associated with each source router in the multicast group based on a minimum-branching shortest path tree rooted at the source router; storing in the forwarding cache identities of the set of outgoing interfaces for each source router in the multicast group;

implementing a minimum equivalent subspanner routing algorithm that determines a minimum number of outgoing interfaces for forwarding the packet, wherein the routing algorithm minimizes redundancy in the data cache and generates shortest path trees that are minimum branching at respective root nodes and utilizing this forwarding cache for forwarding multicast packets associated with the multicast group via Internet Protocol at a network layer.

18. In a multicast group, a method for consolidating the forwarding cache of a router, the method comprising implementing a minimum equivalent subspanner routing algorithm that determines a minimum number of outgoing interfaces for forwarding a packet, splitting the forwarding cache into a component containing an entry for the entire multicast group and a component containing an entry for each source router in the multicast group to reduce redundancy in the data cache and generate shortest path trees that are minimum branching at respective root nodes.

19. The method of claim 18, further comprising the steps of:

determining outgoing interfaces for all multicast packets in the multicast group based on a minimum-branching shortest path tree rooted at the router;

determining whether a data packet received by the router is legitimate based on its intended incoming interface derived from a minimum-branching shortest path tree rooted at the source router of the packet;

storing in the forwarding cache identities of the set of outgoing interfaces for the multicast group and the identity of an incoming interface for each source router in the multicast group; and utilizing this consolidated forwarding cache for forwarding multicast packets associated with the multicast group.

20. The method of claim 19 further comprising the steps of:

determining whether a new router has been added to the multicast group; and updating the components of the forwarding cache.

21. The method of claim 20 wherein the method of updating the forwarding cache comprises the steps of:

determining a minimum branching shortest path tree rooted at the new router;

discarding a preexisting redundant alternative shortest path if one is available in accordance with the existing forwarding cache;

modifying accordingly in the forwarding cache identities of the set of outgoing interfaces for the multicast group; and inserting in the forwarding cache an identity of an incoming interface for the new router if the new router is a source router for the multicast group.

* * * * *